United States Patent
Jagt et al.

(10) Patent No.: US 6,795,244 B2
(45) Date of Patent: Sep. 21, 2004

(54) ILLUMINATION ARRANGEMENT

(75) Inventors: Hendrik Johannes Boudewijn Jagt, Eindhoven (NL); Hugo Johan Cornelissen, Eindhoven (NL); Dirk Jan Broer, Eindhoven (NL); Cees Bastiaansen, Montfort (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/203,720

(22) PCT Filed: Dec. 5, 2001

(86) PCT No.: PCT/IB01/02313

§ 371 (c)(1),
(2), (4) Date: Oct. 29, 2002

(87) PCT Pub. No.: WO02/48607

PCT Pub. Date: Jun. 20, 2002

(65) Prior Publication Data

US 2003/0099037 A1 May 29, 2003

(30) Foreign Application Priority Data

Dec. 14, 2000 (EP) .............................................. 00204510

(51) Int. Cl.[7] .......................... G02B 27/28; G02B 5/30; G02F 1/1335

(52) U.S. Cl. ............................. 359/494; 359/497; 349/9
(58) Field of Search ................................. 359/494, 485, 359/487, 497, 500, 501, 483, 488; 362/311, 19, 26, 31, 299, 300–301, 307; 349/65, 9, 117, 98

(56) References Cited

U.S. PATENT DOCUMENTS

| | | | | |
|---|---|---|---|---|
| 5,485,229 A | * | 1/1996 | Hare | 351/215 |
| 5,845,035 A | * | 12/1998 | Wimberger-Friedl | 385/129 |
| 6,020,944 A | * | 2/2000 | Hoshi | 349/62 |

* cited by examiner

Primary Examiner—Hung Xuan Dang
Assistant Examiner—Joseph Martinez

(57) ABSTRACT

An arrangement for providing polarized light to, e.g. a LCD, is disclosed. The arrangement comprises a substrate (201) and a top layer (202). The substrate (201) is preferably optically anisotropic and the top layer (202) is either isotropic or anisotropic. The respective indices of refraction are chosen such that polarization separation occurs at the interface (214) between the substrate (201) and the top layer (202). Furthermore, the indices of refraction are chosen such that there are no restrictions on the angle of incidence ($\theta_i$) of the incoming light (L), and hence obviating the need for collimation of the incoming light (L). The top layer (202) comprises light outcoupling structures, internally or externally.

10 Claims, 4 Drawing Sheets

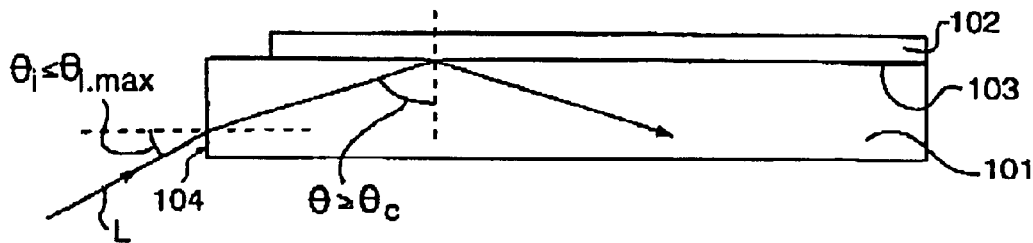
FIG. 1a [PRIOR ART]
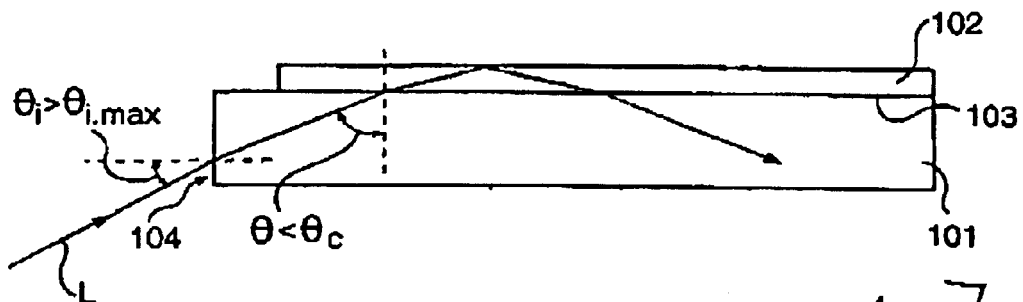
FIG. 1b [PRIOR ART]
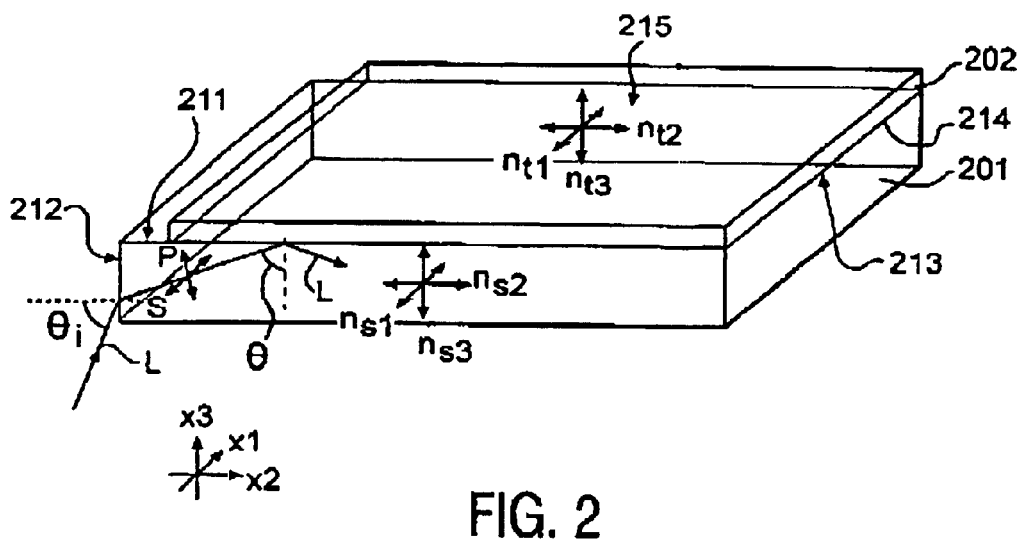
FIG. 2

ILLUMINATION ARRANGEMENT

TECHNICAL FIELD

The present invention relates to an illumination arrangement for providing polarized light to a flat panel display and a display comprising such an illumination arrangement.

PRIOR ART

Flat panel displays of the liquid crystal type (i.e. LCDs) are today widely used in products of very different character and fields of application. Many applications include small portable battery powered units such as portable telephones and computers. An obviously important feature of such applications is that of power consumption, a factor which may be decisive for a consumer when selecting between products of different manufacturers.

A requirement for a backlit LCD is that it has to be illuminated with linearly polarized light in order to function properly. In order to obtain polarized light, means for polarizing "ordinary" non-polarized light must be used. This usually entails putting so-called polarizers in the path of the non-polarized light having the effect of removing a large part of the incoming light. Since many of the applications involve portable equipment, battery power is required. However efficient the light sources may be, low power consumption will always be a key consideration.

Hence, a general problem in the field of the present invention is that there is a lack of efficiency in present day illumination arrangements for providing polarized light.

U.S. Pat. No. 5,845,035 discloses an illumination system for a flat panel picture display device. The system disclosed comprises a light wave-guide consisting of two layers, one layer which is optically anisotropic having indices of refraction $n_o$ and $n_e$, and a second layer which is optically isotropic having an index of refraction $n_i$.

It can be shown that the polarization separation in the configuration of U.S. Pat. No. 5,845,035 only occurs under limited conditions and only for limited ranges of the angle of incidence θ of the incoming light, the angle of incidence θ being the angle between the normal direction of the layers and the incident light.

In order to obtain polarization separation, i.e. obtain polarized light for illumination of e.g. a LCD, U.S. Pat. No. 5,845,035 shows that the index of refraction $n_i$ of the second layer should match either of the indices of refraction $n_o$, $n_e$ of the first layer.

These restrictions mean that, for an illumination system according to prior art to be efficient, i.e. in order to obtain efficient polarization separation at the interface, the light entering the system has to be collimated within a certain range, as shown in U.S. Pat. No. 5,808,709. This, needless to say, adds to the complexity of the illumination system or, if no collimation is applied, severe degradation of the efficiency of the system.

SUMMARY OF THE INVENTION

As will be illustrated in more detail below, it can be shown that, in order to get polarization separation at the interface between the layers there exists a restriction on the angle of incidence θ in that it has to be larger than a critical angle of incidence $θ_c$. This implies a restriction on the angle of incidence $θ_i$ at the incoupling facet of the illumination system as will be illustrated in more detail below.

An object of the present invention is thus to overcome the problems related to prior art systems as discussed above. To this end, an illumination arrangement and display system are provided as claimed below.

An illumination arrangement according to the present invention thus comprises an optically anisotropic substrate with a top surface and a side face. The side face receives incoming light (L), preferably from an external light source. Along the substrate is a top layer located. The top layer has a bottom surface that interfaces the top surface of the substrate, for example being in abutment with the surface of the substrate.

The substrate and the top layer have refractive indices such that a first polarization component of light directed into the substrate through said side face will be internally reflected back into the substrate at the interface between the substrate and the top layer, notwithstanding the incident angle at said side face.

A second polarization component of light directed into the substrate through the side face will be refracted into the top layer at the interface between the substrate and the top layer, notwithstanding the incident angle at said side face.

In some more detail, polarization of incoming light is obtained in that a first index of refraction of the substrate along a first direction relates to a first index of refraction of the top layer along the first direction according to the expression $n_{s1} \geq sqrt(1+n_{t1}*n_{t1})$. This has the effect that, for values of the first index of refraction of the substrate along the first direction being higher than $sqrt(1+n_{t1}*n_{t1})$, light experiencing these refractive indices and having any angle of incidence with respect to the side face of the substrate will be subject to total internal reflection in the interface between the substrate and the top layer and thus not reaching the top layer.

Furthermore, a weighted average value of a second index of refraction of the substrate along a second direction and a third index of refraction of the substrate along a third direction, is lower than a weighted average value of a second index of refraction of the top layer along the second direction and a third index of refraction of the top layer along the third direction. This has the effect of light experiencing these indices being refracted into the top layer, for all angles of incidence with respect to the side face of the substrate, i.e. regardless of the angle θ.

Embodiments of an illumination arrangement according to the present invention include combinations of optically anisotropic substrates with either isotropic or anisotropic top layers.

Another aspect of the present invention is that of a display system comprising an illumination arrangement as disclosed above and which also may comprise a light source arranged to illuminate the side face (212) of the substrate. A display, such as a flat panel LCD is arranged to receive polarized light emanating from the top layer. In such a case the LCD is a separate unit abutting the illuminating arrangement. However, it is possible according to yet another aspect of the invention, to incorporate a display unit, such as a LCD, within the top layer, in which case it receive polarized light from the interface between the substrate and the top layer.

An advantage with an illumination arrangement as disclosed is that it provides efficient polarization and it may by virtue of that fact be used in portable devices, such as computers, telephones etc. where power consumption is a critical factor.

Another advantage of such an arrangement is that it provides polarized light for a wide range of angles of incidence for incoming light which eliminates the need for collimating units such as lenses etc. between the source of light and the substrate of the arrangement. This means that display systems may be of low complexity containing fewer parts than systems according to prior art.

These and other aspects of the invention will be apparent from and elucidated with reference to the embodiments described hereinafter.

BRIEF DESCRIPTION OF THE DRAWINGS

FIGS. 1a and 1b shows schematically a side view of an illumination arrangement illustrating restrictions of prior art arrangements.

FIG. 2 shows schematically a perspective view of an illumination arrangement according to the present invention.

DETAILED DESCRIPTION OF PREFERRED EMBODIMENTS

Figure 3:
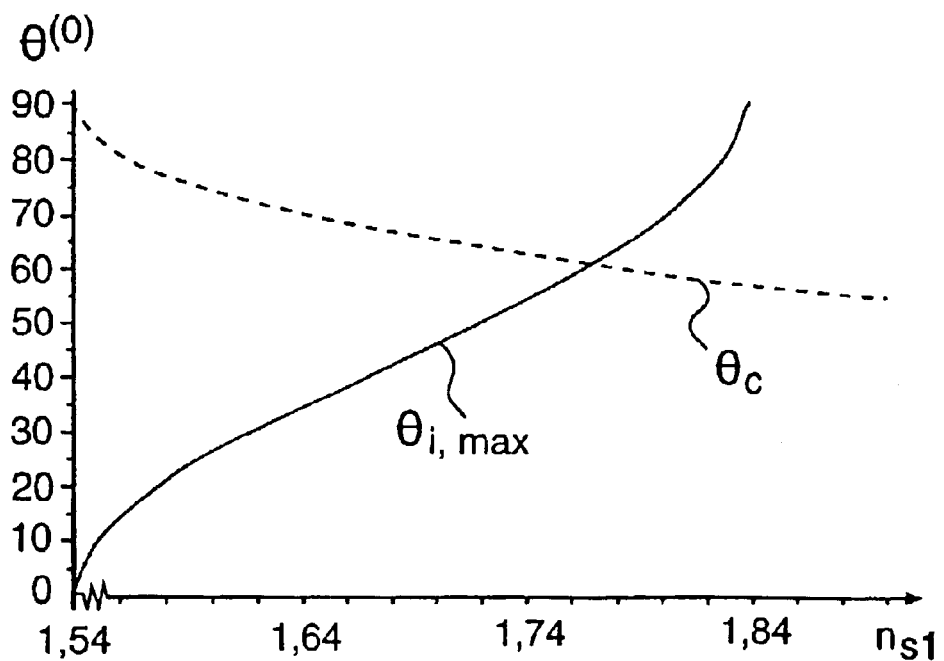
FIG. 3 shows a diagram illustrating parameters relating to an illumination arrangement according to the present invention.

In order to introduce terminology of the geometry relating to the field of the present invention, as well as illustrate restrictions relating to prior art arrangements according to the above referred U.S. Pat. No. 5,845,035, FIG. 1a and FIG. 1b show light L entering an optically isotropic substrate 101 having an index of refraction $n_i$. On top of the isotropic substrate 101 is an anisotropic top layer 102 having indices of refraction $n_0$ and $n_e$ in respective directions of anisotropy.

A drawback relating to prior art, as disclosed by U.S. Pat. No. 5,845,035 is that the polarization separation only works under limited conditions and for limited angles of incidence θ: either $n_0$ or $n_e$ should match $n_i$ in order for polarization separation to occur at the interface 103 between the isotropic substrate 101 and the top layer 102. That is:

1. $n_0 < n_e$, $n_0 = n_i$

Incoupling in the anisotropic layer $\sin(\theta) > \sin(\theta_c) = n_i/n_e$

2. $n_0 < n_e$, $n_e = n_i$

Incoupling in the isotropic layer $\sin(\theta) > \sin(\theta_c) = n_0/n_e$ where θ is the angle of incidence on the interface 103 and $\theta_c$ is the critical angle.

Hence, in order to get polarization separation it is necessary to restrict the angles of incidence on the interface 103 to be larger than the critical angle $\theta_c$. This has to be done by restricting the angle of incidence $\theta_i$ at the incoupling side face 104. That is, the light L entering the substrate must be collimated within a certain angular range for the polarization separation to occur efficiently. This implies an added complexity of an illumination system and also possible loss of efficiency. If no collimation is used, the efficiency of the polarization separation degrades substantially.

Turning now to FIG. 2, a solution to problems relating to prior art illumination systems will be presented. A device according to the invention comprises a substrate 201 and a top layer 202. The substrate 201 is preferably optically anisotropic and the top layer is either optically isotropic or anisotropic, as will be exemplified below.

Light L is coupled into the substrate 201 having indices of refraction $n_{s1}$, $n_{s2}$ and $n_{s3}$, where index 1, 2, and 3 refers to the directions x1, x2 and x3 respectively as indicated in FIG. 2. The top layer 202 is optically characterized, in the general case, by indices of refraction $n_{t1}$, $n_{t2}$ and $n_{t3}$. In a case of an isotropic top layer, the indices would relate as $n_{t1} = n_{t2} = n_{t3}$. As will be discussed below, by a suitable choice of indices of refraction, the restrictions on the collimation of the incoming light L can be reduced or even eliminated.

One polarization component of the light L, for example component S, encounters the indices of refraction $n_{s1}$ in the substrate 201 and $n_{t1}$ in the top layer 202. If $n_{s1} > n_{t1}$, then S polarized light is not coupled into the top layer 202, provided the angle of incidence θ is larger than the critical angle $\theta_c$, defined as:

$$\theta_c = \arcsin(n_{t1}/n_{s1}) \qquad (1)$$

The orthogonal polarization P encounters a weighted average of the indices of refraction $n_{s2}$ and $n_{s3}$ in the substrate 201 and of $n_{t2}$ and $n_{t3}$ in the top layer 202. If this average index in the substrate 201 is smaller than the average index in the top layer 202, then P polarized light is refracted into the top layer 202 for all angles of incidence θ.

The incoupling angle $\theta_{i,max}$ at the incoupling surface 213, i.e. air to substrate 201, is defined with respect to the normal of the surface 212 and related to the critical angle $\theta_c$ as:

$$\theta_{i,max} = \arcsin(n_{s1} * \cos(\theta_c)) \qquad (2)$$

The incoupling angle $\theta_{i,max}$ is the maximum incoupling angle for which Total Internal Reflection (TIR) will occur at the substrate to top layer interface 214. Incoupled light should be collimated within the range $+\theta_{i,max}$ to $-\theta_{i,max}$ for full polarization separation to occur using a structure as shown in FIG. 2.

FIG. 3 shows an example of $\theta_c$ and $\theta_{i,max}$ as a function of $n_{s1}$ for a chosen value on $n_{t1}$ of 1.54. For increasing $n_{s1}$ an increasing angular range can be coupled in and be totally internally reflected at the interface 214. No collimation is required when light of all incoupled angles at the incoupling surface 212 will be totally internally reflected at the substrate to top layer interface 214. It can be calculated from equation (2) that this condition depends on the combination of the refractive indices of the substrate 201 and the top layer 202 as:

$$n_{s1} = sqrt(1 + n_{t1} * n_{t1}) \qquad (3)$$

Figure 4:
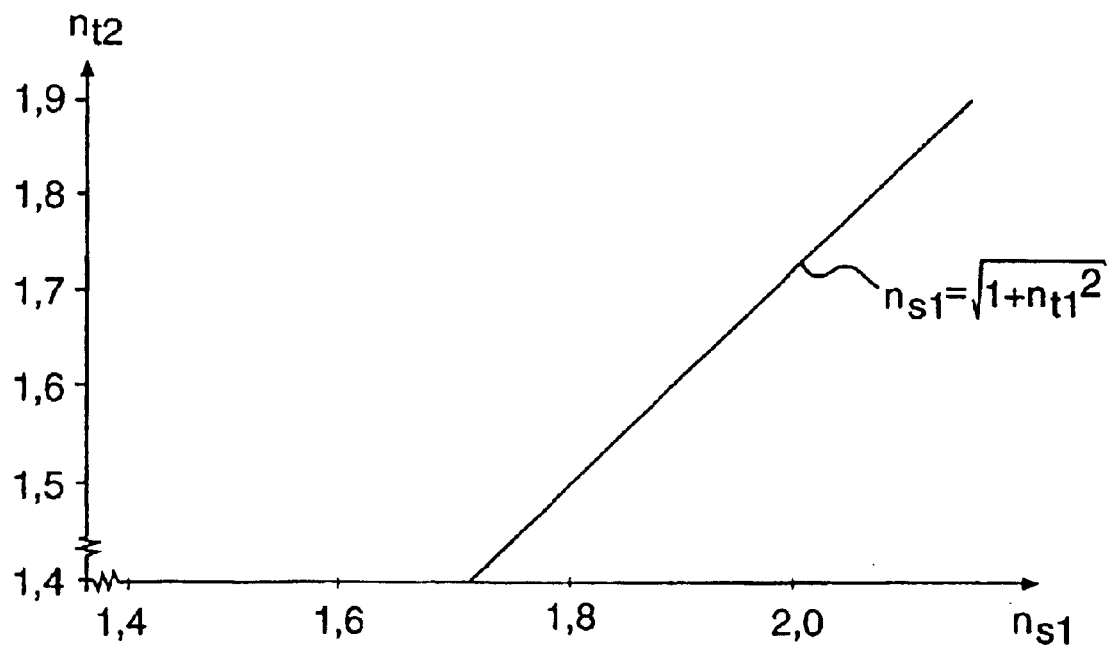
FIG. 4 shows a diagram illustrating parameters relating to an illumination arrangement according to the present invention.

This condition is depicted in the diagram of FIG. 4. For $n_{s1}$-values higher than the condition according to equation (3) S-polarized light of all incoupling angles will be total internally reflected at the interface 214, whereas for lower $n_{s1}$-values light of only a specific incoupling angular range will be total internally reflected at the interface 214 and collimation should in such a case be used.

Such high $n_{s1}$-values are in practice difficult to achieve for optically isotropic substrates but more easily achieved using anisotropic substrates in which generally $n_e$ can be very large, as will be seen in the examples below.

Outcoupling of polarized light can be obtained either inside the top layer 202 (or inside any subsequent top layer in the case there is a multiple stack of top layers) or at the surface 215 of the top layer 202 (or inside any subsequent top layer in the case there is a multiple stack of top layers).

For outcoupling inside the top layer 202 either anisotropic or isotropic scattering of the emitted polarized light can be used, provided that depolarization in the scattering process can be neglected.

For outcoupling at the surface 215 of the top layer 202 any microstructure, e.g. embossed or laser written relief structures, lens arrays, refractive index fluctuations or surface roughness can be utilized. However, again, the outcoupling process should be such that depolarization is not significant.

A first example of the processes described above will now be illustrated with reference to FIGS. 5a and 5b. The substrate 501 is, e.g., a stretched PEN film, which is stretched in the $x_1$-direction, having the indices of refraction $n_{s1}=1.86$ and $n_{s2}=n_{s3}=1.56$. The top layer 502 is, e.g., a stretched PET-film, which is stretched in the x2-direction, having the indices of refraction $n_{t1}=n_{t3}=1.54$ and $n_{t2}=1.67$.

Figure 5A:
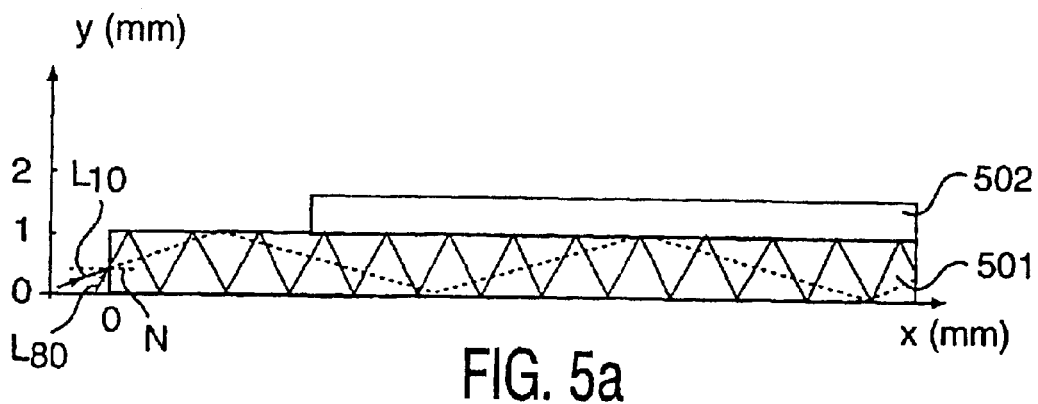
FIGS. 5a and 5b shows schematically side views of light paths in a first embodiment of an illumination arrangement according to the present invention.

In FIG. 5a a cross section of an illumination arrangement is shown. Light L having polarization 1 encounters the refractive indices $n_{s1}$ and $n_{t1}$ for incoupling angles in the substrate 501 $\theta_{i,air}=10°$ (dashed line) and 80° (solid line) respectively. $\theta_{i,air}$ is defined as the angle of the incoupled light into the substrate 501 with respect to the normal N of the entrance plane.

Figure 5B:
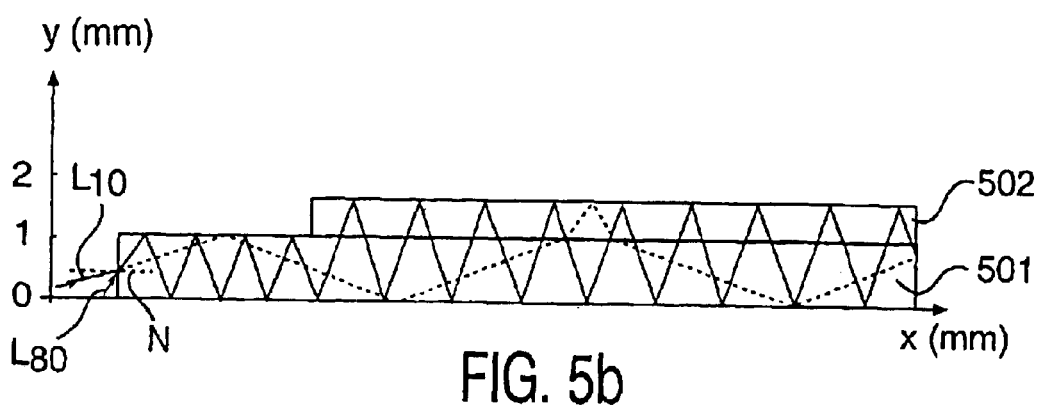

In FIG. 5b a cross section is shown for light L having polarization 2 which encounters the refractive indices $n_{s2},n_{s3}$ and $n_{t2},n_{t3}$ for similar incoupling angles in the substrate 501.

As can be observed from the examples in FIGS. 5a and 5b, only polarization 2 will enter the top layer 502 where it can be coupled out by means of a suitable arrangement as is known in the art. The critical angle for this configuration is defined by $\theta_c=\arcsin(n_{t1}/n_{s1})=55.9°$. Recalculating the condition for TIR at the interface between substrate 501 and top layer 502 to incoupling angles in the substrate 501 results in full polarization separation at the interface for all incoupled light angles ($\theta_{i,air}=0°$ to 90°), that is no collimation of incoupled light is needed.

A second example of the processes described above will now be illustrated with reference to FIGS. 6a and 6b. The substrate 601 is, e.g., a stretched PEN film, which is stretched in the x1-direction, having the indices of refraction $n_{s1}=1.86$ and $n_{s2}=n_{s3}=1.56$. The top layer 602 is, e.g., an isotropic PC-film having the indices of refraction $n_{t1}=n_{t2}=n_{t3}=1.57$.

Figure 6A:
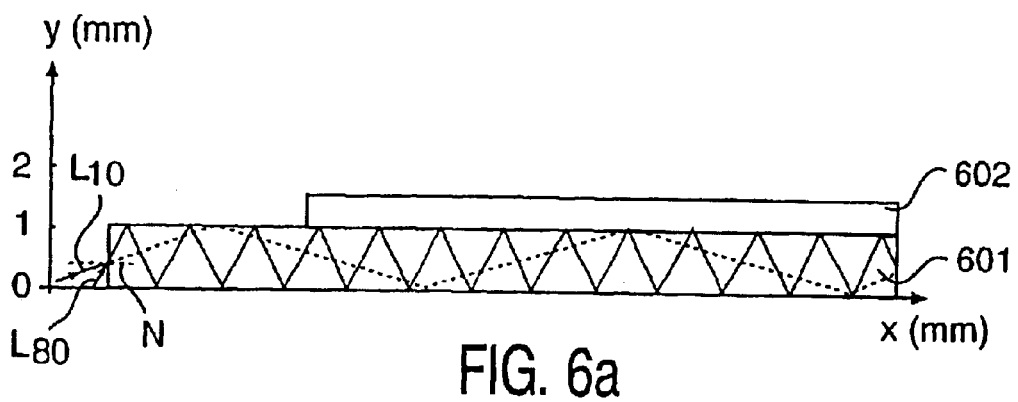
FIGS. 6a and 6b shows schematically side views of light paths in a second embodiment of an illumination arrangement according to the present invention.

In FIG. 6a a cross section of an illumination arrangement is shown. Light L having polarization 1 encounters the refractive indices $n_{s1}$ and $n_{t1}$ for incoupling angles in the substrate 501 $\theta_{i,air}=10°$ (dashed line) and 80° (solid line) respectively. $\theta_{i,air}$ is defined as the angle of the incoupled light into the substrate 601 with respect to the normal N of the entrance plane.

Figure 6B:
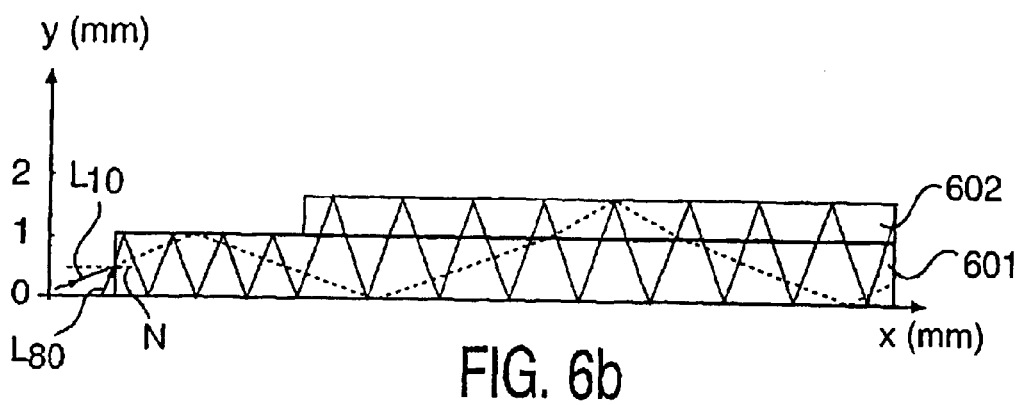

In FIG. 6b a cross section is shown for light L having polarization 2 which encounters the refractive indices $n_{s2},n_{s3}$ and $n_{t2},n_{t3}$ for similar incoupling angles in the substrate 601.

Again, as can be observed from the examples in FIGS. 6a and 6b, only polarization 2 will enter the top layer 502 where it can be coupled out by means of a suitable arrangement as is known in the art. The critical angle for this configuration is defined by $\theta_c=\arcsin(n_{t1}/n_{s1})=57.57°$. Recalculating the condition for TIR at the interface between substrate 601 and top layer 602 to incoupling angles in the substrate 601 results in full polarization separation at the interface for all incoupled light angles smaller than $\theta_{i,air}=85.8°$, that is in practice for virtually all incoupled light no collimation is needed.

Figure 7A:
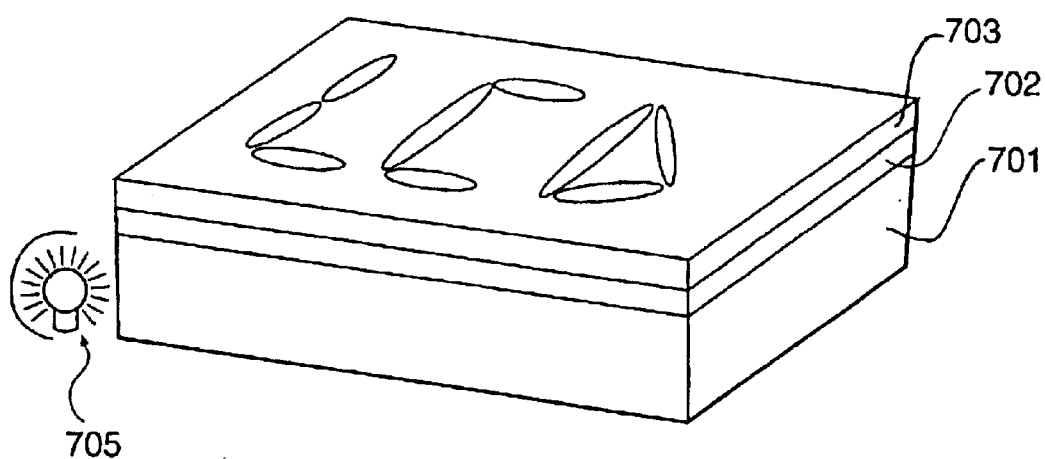
FIG. 7 shows schematically a perspective view of a display system according to the present invention.
Figure 7B:
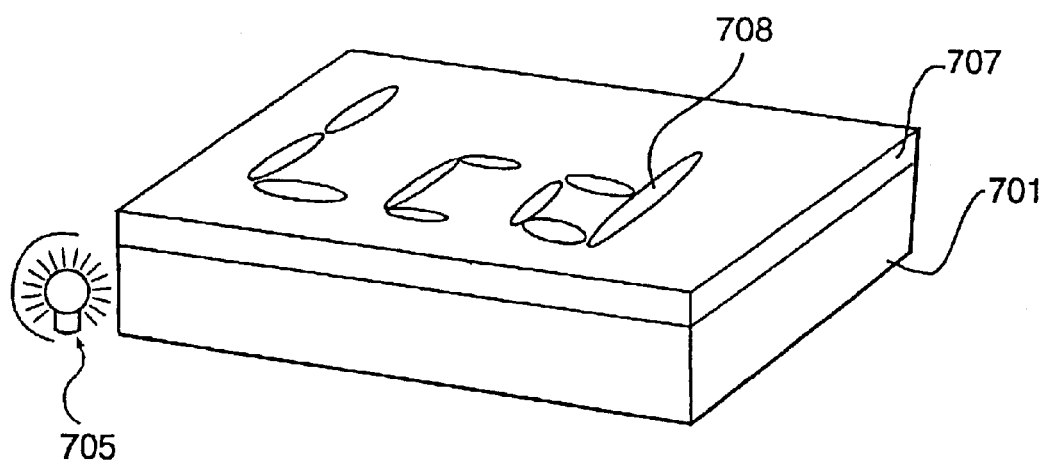

FIGS. 7a and 7b illustrate schematically backlit LCD-systems according to the present invention. LCD-units 703 and 707 comprise liquid crystals 704 and 708 respectively, that requires polarized light, originating from a light source 705, in order to function properly, as is known in the art.

In the arrangement shown in FIG. 7a, the LCD unit 703 is a separate unit located on top of a top layer 702 and a substrate 701. The substrate 701 and the top layer 702 is preferably arranged as has been discussed above in connection with FIGS. 1–6. Outcoupling of polarized light into the LCD unit 703 from the top layer 702 is performed as discussed above, e.g. by means of relief structures.

In the arrangement shown in FIG. 7b, the LCD unit is a unit which is integrated as a top layer 707 which is located on a substrate 701. The substrate 701 and the LCD/top layer 707 are preferably arranged as has been discussed above in connection with FIGS. 1–6. Outcoupling of polarized light into the LCD unit/top layer 707 is performed as discussed above, e.g. by way of scattering.

What is claimed is:

1. An illumination arrangement comprising:
   an optically anisotropic substrate having a top surface and a side face, the side face being arranged to receive incoming light, and
   a top layer having a bottom surface which interfaces said top surface of the substrate,
   wherein:
      said substrate and said top layer have refractive indices such that a first polarization component of light directed into the substrate through said side face will be internally reflected back into the substrate at the interface between said substrate and said top layer, while
      a second polarization component of light directed into the substrate through said side face will be refracted into the top layer at the interface between said substrate and said top layer, and
      a first index of refraction, $n_{s1}$, in the substrate along a first direction relates to a first index of refraction, $n_{t1}$, of the top layer along the first direction, according to the expression
   $n_{s1} \geq \text{sqrt}(1+n_{t1}*n_{t1})$, and
      a weighted avenge value of a second index of refraction of the substrate along a second direction and a third index of refraction of the substrate along a third direction, is lower than or equal to a weighted average value of a second index of refraction of the top layer along the second direction and a third index of refraction of the top layer along the third direction.

2. The illumination arrangement according to claim 1, wherein the top layer is optically isotropic.

3. A display system comprising
   an illumination arrangement according to claim 2,
   a light source arranged to direct light towards the side face of the substrate, and
   a display arranged to receive polarized light emanating from the top layer.

4. A display system comprising
   an illumination arrangement according to claim 2,
   a light source arranged to direct light towards the side face of the substrate, and
   a display comprised in the top layer and arranged to receive polarized light from the interface between the substrate and the top layer.

5. The illumination arrangement according to claim 1, wherein the top layer is optically anisotropic.

6. A display system comprising
   an illumination arrangement according to claim 5,
   a light source arranged to direct light towards the side face of the substrate, and a display arranged to receive polarized light emanating from the top layer.

7. A display system comprising
an illumination arrangement according to claim 5,
a light source arranged to direct light towards the side face of the substrate, and
a display comprised in the top layer and arranged to receive polarized light from the interface between the substrate and the top layer.

8. A display system comprising
an illumination arrangement according to claim 1
a light source arranged to direct light towards the side face of the substrate, and
a display arranged to receive polarized light emanating from the top layer.

9. A display system comprising
an illumination arrangement according to claim 1,
a light source arranged to direct light towards the side face of the substrate, and
a display comprised in the top layer and arranged to receive polarized light from the interface between the substrate and the top layer.

10. A method of illuminating a display, comprising:
directing non-polarized light into an optically anisotropic substrate through a side face thereof,
providing said substrate with an optical top layer,
choosing the refractive indices of said substrate and said top layer in such a way that a first polarization component of said non-polarized light, when impinging on the interface between said substrate and said top layer, is internally reflected back into the substrate, and a second polarization component of said non-polarized light, when impinging on said interface, is refracted into the top layer, and
extracting light from said top layer for the illumination of the display,
wherein
the refractive indices of the substrate and the top layer are chosen much that
the first polarization component experiences one refractive index in the substrate, $n_{s1}$, and
another refractive index in the top layer, $n_{t1}$,
the refractive indices being related according to the expression $n_{s1} \geq \text{sqrt}(1+n_{t1}*n_{t1})$, and
the second polarization component experiences a lower or equal refractive index in the substrate than in the top layer.

* * * * *